(12) United States Patent
Shen et al.

(10) Patent No.: US 11,573,902 B1
(45) Date of Patent: Feb. 7, 2023

(54) CONTROLLING ISSUE RATES OF REQUESTS OF VARYING BROADCAST SCOPES IN A DATA PROCESSING SYSTEM

(71) Applicant: INTERNATIONAL BUSINESS MACHINES CORPORATION, Armonk, NY (US)

(72) Inventors: Hugh Shen, Round Rock, TX (US); Guy L. Guthrie, Round Rock, TX (US); Jeffrey A. Stuecheli, Austin, TX (US); Luke Murray, Austin, TX (US); Alexander Michael Taft, Austin, TX (US); Bernard C. Drerup, Austin, TX (US); Derek E. Williams, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/405,713

(22) Filed: Aug. 18, 2021

(51) Int. Cl.
*G06F 12/08* (2016.01)
*G06F 3/06* (2006.01)
*G06F 12/0862* (2016.01)
*G06F 12/0811* (2016.01)
*G06F 12/0817* (2016.01)

(52) U.S. Cl.
CPC ........ *G06F 12/0862* (2013.01); *G06F 3/0604* (2013.01); *G06F 3/0635* (2013.01); *G06F 3/0659* (2013.01); *G06F 3/0679* (2013.01); *G06F 12/0811* (2013.01); *G06F 12/0828* (2013.01)

(58) Field of Classification Search
CPC .. G06F 12/0862; G06F 3/0604; G06F 3/0635; G06F 3/0659; G06F 3/0679; G06F 12/0811; G06F 12/0828
See application file for complete search history.

(56) References Cited

U.S. PATENT DOCUMENTS

| | | | |
|---|---|---|---|
| 9,619,390 B2 * | 4/2017 | Guthrie | G06F 12/0862 |
| 10,394,636 B2 | 8/2019 | Guthrie et al. | |
| 10,705,987 B2 | 7/2020 | Avrukin et al. | |
| 10,852,810 B2 | 12/2020 | Lai et al. | |
| 10,997,075 B2 | 5/2021 | Guthrie et al. | |
| 2008/0320236 A1 | 12/2008 | Ueda et al. | |

(Continued)

OTHER PUBLICATIONS

Agarwal et al.; "Selective GPU Caches to Eliminate CPU-GPU HW Cache Coherence", copyright 2016 IEEE. (see as copied attached).

(Continued)

*Primary Examiner* — Masud K Khan
(74) *Attorney, Agent, or Firm* — Brian F. Russell; Nathan Rau

(57) ABSTRACT

A coherent data processing system includes a system fabric communicatively coupling a plurality of coherence participants and fabric control logic. The fabric control logic quantifies congestion on the system fabric based on coherence messages associated with commands issued on the system fabric. Based on the congestion on the system fabric, the fabric control logic determines a rate of request issuance applicable to a set of coherence participants among the plurality of coherence participants. The fabric control logic issues at least one rate command to set a rate of request issuance to the system fabric of the set of coherence participants.

17 Claims, 10 Drawing Sheets

(56) References Cited

U.S. PATENT DOCUMENTS

| | | | |
|---|---|---|---|
| 2011/0219208 A1* | 9/2011 | Asaad | G06F 9/06 |
| | | | 712/12 |
| 2012/0204045 A1 | 8/2012 | Diab et al. | |
| 2017/0293557 A1* | 10/2017 | Guthrie | G06F 12/0842 |
| 2017/0293561 A1 | 10/2017 | Dwiel et al. | |
| 2018/0032436 A1 | 2/2018 | Lee | |
| 2020/0142635 A1 | 5/2020 | Nguyen et al. | |
| 2020/0193940 A1 | 6/2020 | Boles et al. | |
| 2020/0250088 A1 | 8/2020 | Barner et al. | |
| 2021/0020224 A1 | 1/2021 | Cox et al. | |
| 2021/0021526 A1* | 1/2021 | Bharadwaj | G06F 3/0659 |

OTHER PUBLICATIONS

Agarwal et al.; "Unblocking Bandwidth for GPUs in CC-NUMA Systems", Appears in the Proceedings of the 2015 International Symposium on High Performance Computer Architecture (HPCA). (see as copied attached).

Deb et al.; "ECAP: Energy Efficient Caching for Prefetch Blocks in Tiled Chip Multiprocessors", Accepted Apr. 10, 2019. (see as copied attached).

Jin et al.; "NetCache: Balancing Key-Value Stores With Fast In-Network Caching", SOSP '17, Oct. 28, 2017, Shanghai, China. (see as copied attached).

Li et al.; "Profile-Driven Energy reduction in Network-on-Chips", Jun. 11-13, 2007, San Diego, California. (see as copied attached).

* cited by examiner

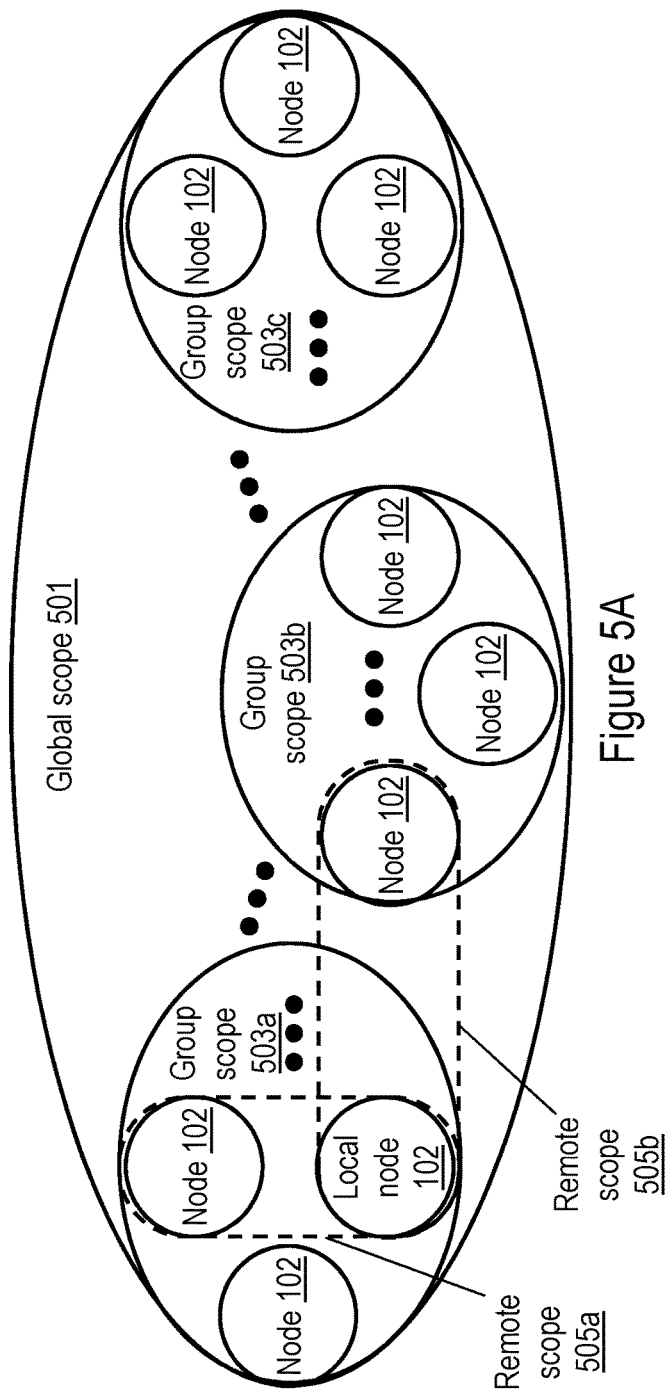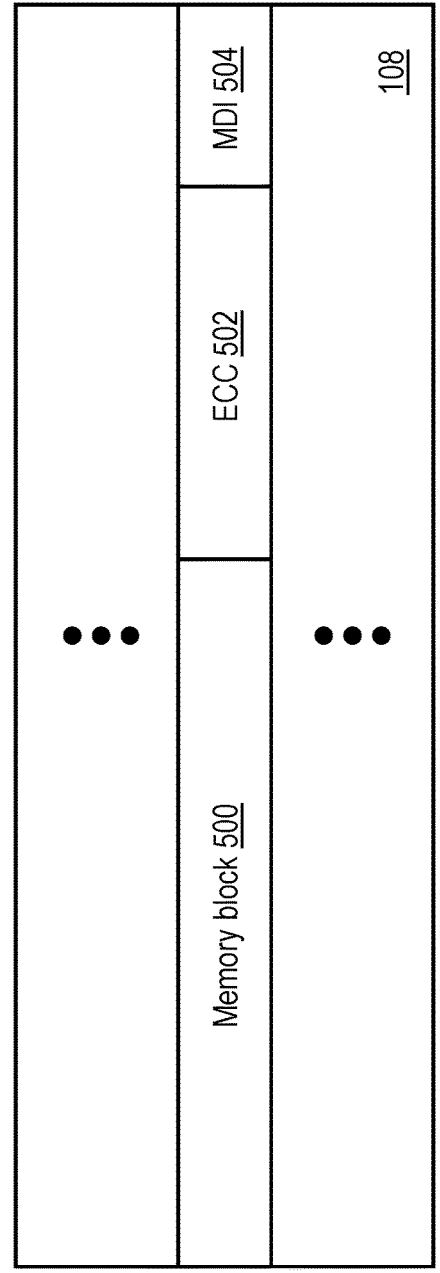
Figure 5A
Figure 5B

US 11,573,902 B1

CONTROLLING ISSUE RATES OF REQUESTS OF VARYING BROADCAST SCOPES IN A DATA PROCESSING SYSTEM

BACKGROUND

The present invention relates in general to data processing and, in particular, to controlling the issue rates of requests in a data processing system.

A conventional symmetric multiprocessor (SMP) computer system, such as a server computer system, includes multiple processing units all coupled to a system fabric, which typically comprises one or more address, data and control buses. Coupled to the system fabric is a system memory, which represents the lowest level of shared memory storage in the SMP computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access command.

Prior art snoop-based coherence protocols have generally, with some exceptions, assumed that to maintain coherency a global broadcast of memory access commands and associated coherence messages had to be employed. That is, that all memory access commands and all related coherence messages must be received by all coherence participants in an SMP computer system. More recently, some coherence protocols allow some memory access commands and the related coherence messages to be communicated with only a subset of the coherence participants in an SMP computer system.

As system scale of an SMP computer system increases, utilization of the system fabric of the SMP computer system generally increases in a geometric manner. The present disclosure appreciates that it would be useful and desirable to control utilization of the system fabric in a distributed manner in order to efficiently manage the available bandwidth.

BRIEF SUMMARY

In at least one embodiment, a coherent data processing system includes a system fabric communicatively coupling a plurality of coherence participants and fabric control logic. The fabric control logic quantifies congestion on the system fabric based on coherence messages associated with commands issued on the system fabric. Based on the congestion on the system fabric, the fabric control logic determines a rate of request issuance applicable to a set of coherence participants among the plurality of coherence participants. The fabric control logic issues at least one rate command to set a rate of request issuance to the system fabric of the set of coherence participants.

BRIEF DESCRIPTION OF THE SEVERAL VIEWS OF THE DRAWINGS

FIG. 5A depicts various scopes of operations on the interconnect fabric of the data processing system of FIG. 1;

FIG. 5B illustrates a memory domain indicator (MDI) in accordance with one embodiment;

DETAILED DESCRIPTION

Figure 1:
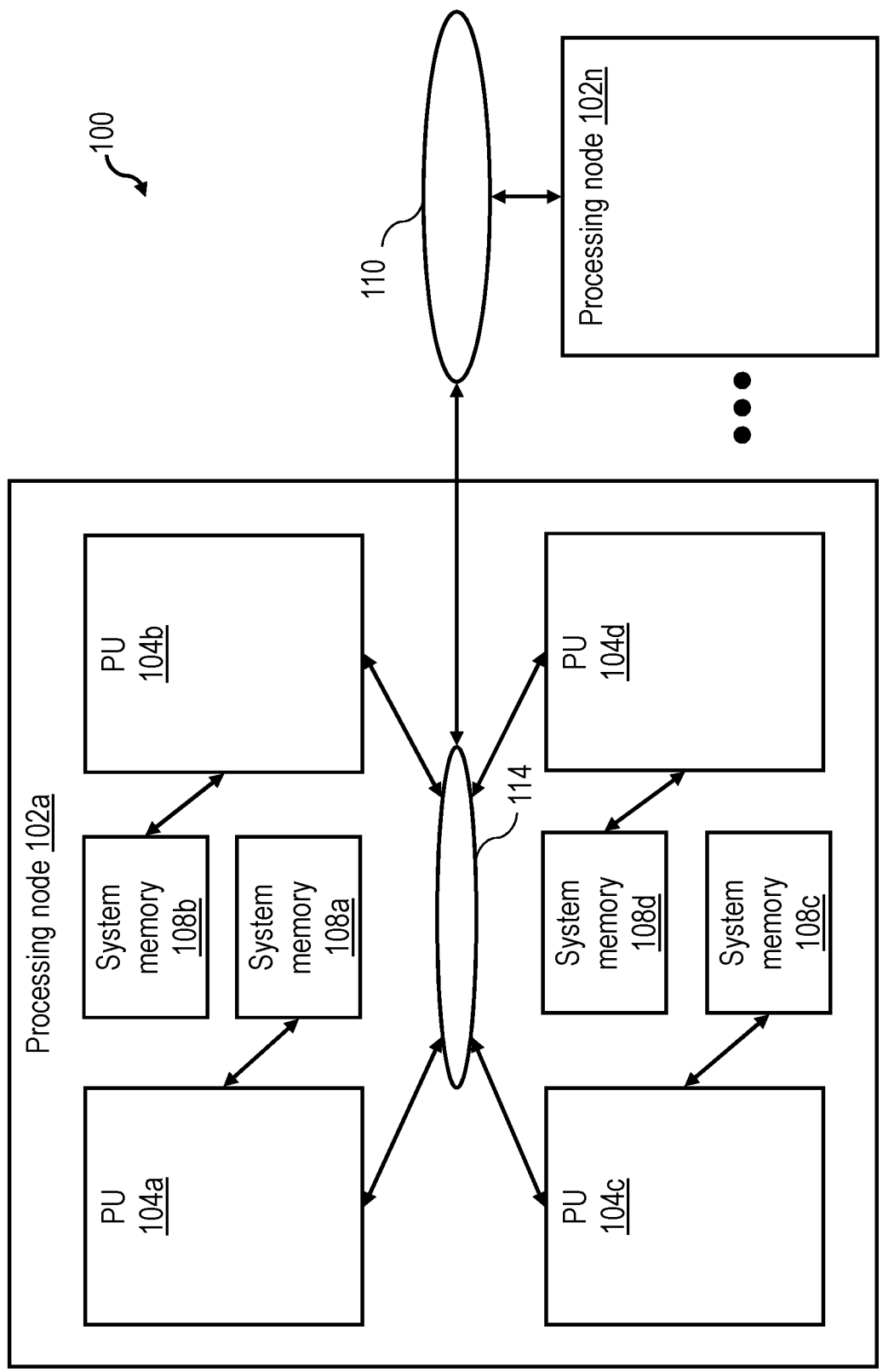
FIG. 1 is a high-level block diagram of an exemplary cache coherent data processing system in accordance with one embodiment.

With reference now to the figures and, in particular, with reference to FIG. 1, there is illustrated a high level block diagram of an exemplary embodiment of a cache-coherent symmetric multiprocessor (SMP) data processing system that employs a snoop-based coherence protocol in accordance with one embodiment. As shown, data processing system 100 includes multiple nodes 102a-102n. Nodes 102a-102n are coupled to a system interconnect 110 for conveying address, data and control information. System interconnect 110 may be implemented, for example, as a bused interconnect, a switched interconnect or a hybrid interconnect.

In the depicted embodiment, one or more of nodes 102 are realized as multi-chip modules (MCMs), each containing multiple (e.g., four) processing units 104a-104d. Each processing unit 104 is preferably realized as a respective integrated circuit chip including a substrate on which integrated circuit is formed as is known in the art. The processing units 104a-104d, if any, within a node 102 are coupled for communication by a local interconnect 114, which, like system interconnect 110, may be implemented with one or more buses and/or switches. System interconnect 110 and local interconnects 114 collectively form an interconnect (or system) fabric.

The devices coupled to each local interconnect 114 can include not only processing units 104, but also one or more system memories 108a-108d. Data and instructions residing in system memories 108 can generally be accessed and modified by a processor core in any processing unit 104 in any node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
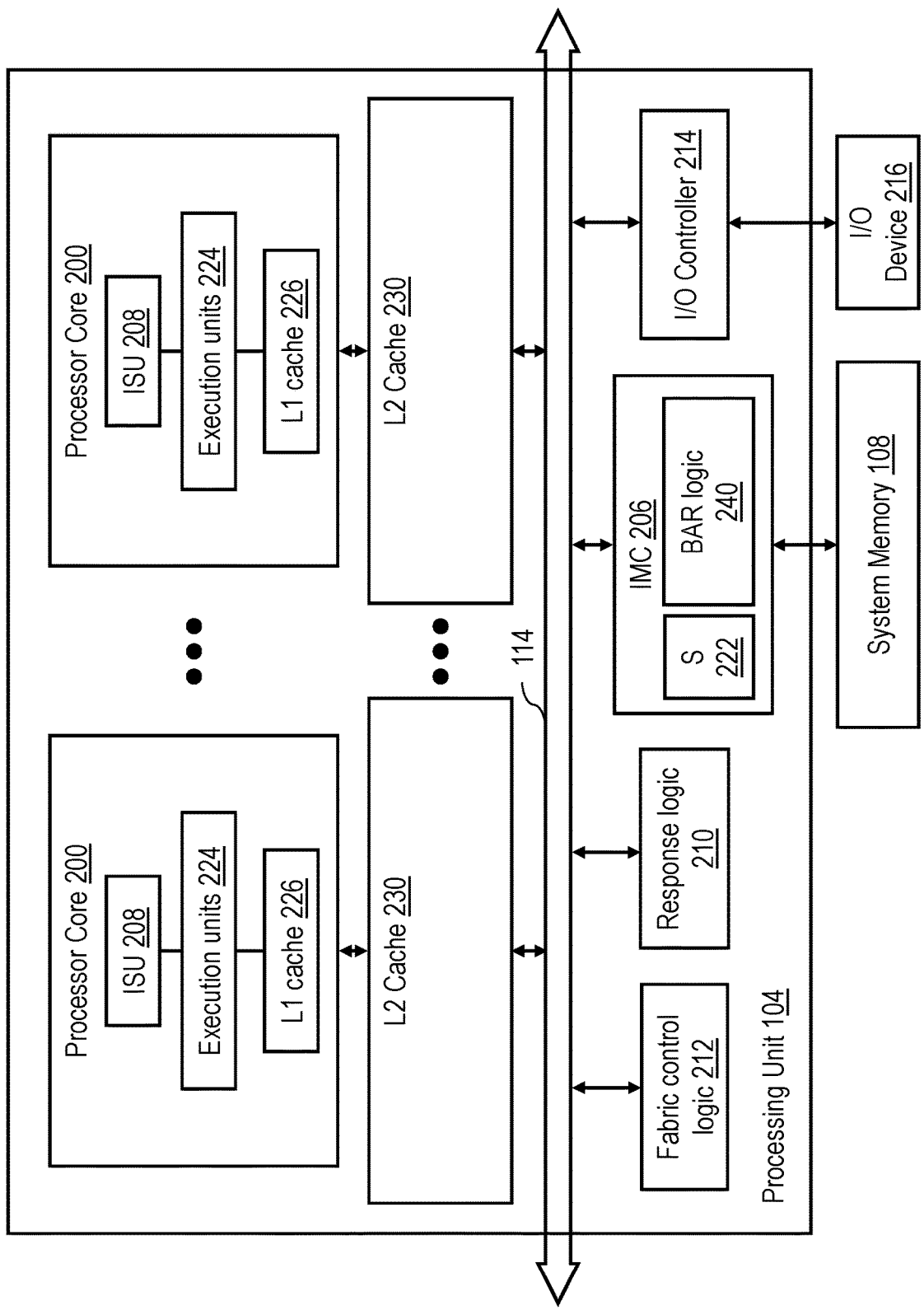
FIG. 2 is a more detailed block diagram of a processing unit within the data processing system of FIG. 1 in accordance with one embodiment.

Referring now to FIG. 2, there is depicted a more detailed block diagram of an exemplary processing unit 104 in accordance with one embodiment. In the depicted embodiment, each processing unit 104 includes multiple processor cores 200 for independently processing instructions and data. In a preferred embodiment, each processor core 200 supports simultaneous multithreading (SMT) and thus is capable of independently executing multiple hardware threads of execution simultaneously. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its node 102 in response to processor and I/O commands on the local interconnect 114. IMC 206 includes one or more snoopers 222 for servicing snooped commands and base address register (BAR) logic 240 by which IMC 206 determines the real addresses that are assigned to storage locations in its system memory 108 (and thus the real addresses for which IMC 206 is responsible).

In the illustrative embodiment, the cache memory hierarchy of processing unit 104 includes a private store-through level one (L1) cache 226 within each processor core 200 as well as a private store-in level two (L2) cache 230. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Figure 6:
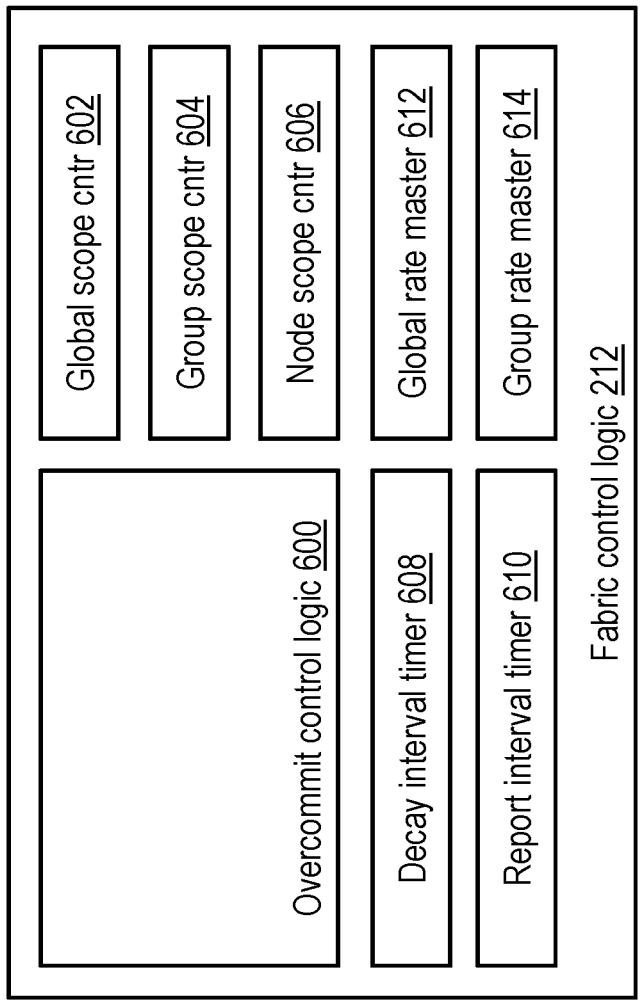
FIG. 6 is a more detailed block diagram of the fabric control logic of FIG. 2 in accordance with one embodiment.

Each processing unit 104 further includes an instance of response logic 210, which, as discussed further below, implements a portion of the distributed snoop-based coherency signaling mechanism that maintains cache coherency within data processing system 100. In addition, each processing unit 104 includes an instance of fabric control logic 212 for controlling communication on the interconnect fabric and selectively forwarding communications between its local interconnect 114 and system interconnect 110. An exemplary embodiment of fabric control logic 212 is depicted in FIG. 6, which is described below. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to commands by I/O device 216.

Figure 3:
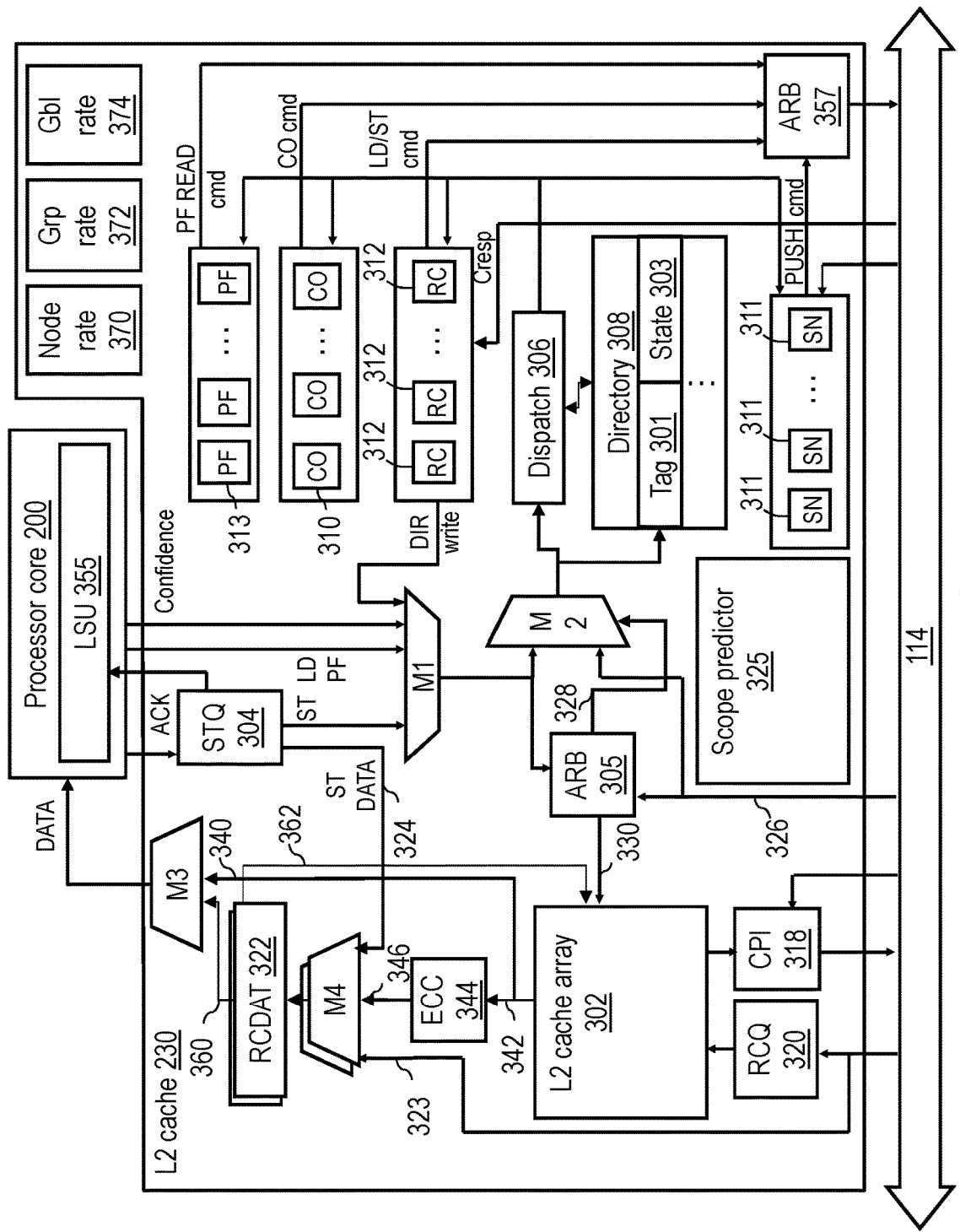
FIG. 3 is a more detailed block diagram of the L2 cache of FIG. 2.

With reference now to FIG. 3, there is illustrated a more detailed block diagram of an exemplary embodiment of an exemplary L2 cache 230 in accordance with one embodiment. As shown in FIG. 3, L2 cache 230 includes a cache array 302 and a directory 308 of the contents of cache array 502. Although not explicitly illustrated, cache array 302 is preferably implemented with a single read port and a single write port to reduce the die area required to implement cache array 302.

Assuming cache array 302 and directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. As understood by those skilled in the art, each directory entry in L2 directory 308 comprises at least a tag field 301, which specifies the particular cache line stored in cache array 302 utilizing a tag portion of the corresponding real address, and a state field 303, which indicates the cache state of the cache line. As utilized herein, the term "cache state" includes (1) a sharing state providing information regarding the sharing (or non-sharing) of the associated cache line among caches within data processing system 100 and/or (2) a domain state providing information regarding the coherence domain(s) in which the associated cache line is then cached (or may possibly be cached).

L2 cache 230 includes multiple (e.g., 16 or 32) read-claim (RC) machines 312 for independently and concurrently servicing load (LD) and store (ST) requests received from the affiliated processor core 200 and multiple prefetch (PF) machines 313 for independently and concurrent servicing PF requests received from the affiliated processor core 200. In addition, L2 cache 230 includes multiple (e.g., 16 or 32) snoop (SN) machines 311 to service remote memory access commands originating from processor cores 102 other than the affiliated processor core 200. Each snoop machine 311 can independently and concurrently handle a remote memory access command "snooped" from local interconnect 114. As will be appreciated, the servicing of memory access requests and commands by L2 cache 230 may require the replacement or invalidation of memory blocks within cache array 302. Accordingly, L2 cache 230 includes CO (castout) machines 310 that manage the removal and writeback of memory blocks from cache array 302.

L2 cache 230 also includes an RC queue 320 and a CPI (castout push intervention) queue 318 that respectively buffer data being inserted into and removed from the cache array 302. RC queue 320 includes a number of buffer entries that each individually correspond to a respective one of RC machines 312 or PF machines 313 such that each machine 312, 313 that is dispatched retrieves data from only the designated buffer entry. Similarly, CPI queue 318 includes a number of buffer entries that each individually correspond to a respective one of the CO machines 310 or SN machines 311, such that each machine 310, 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. At least some of RCDAT buffers 322 have an associated store data multiplexer M4 that selects data bytes from among its inputs for buffering in the RCDAT buffer 322 in response unillustrated select signals generated by arbiter 305.

Arbiter 305 is additionally configured to control multiplexers M1-M2 to order the processing of local memory access requests received from the affiliated processor core 200 and remote requests snooped on local interconnect 114. Memory access requests, including local load and store operations and remote read and write operations, are forwarded in accordance with the arbitration policy implemented by arbiter 305 to a dispatch pipeline 306, where each read/load and store request is processed with respect to directory 308 and cache array 302 over a given number of cycles.

In operation, processor store requests comprising a transaction type (ttype), target real address, and store data are received from the affiliated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load (LD) and prefetch (PF) requests from processor core 200 and directory write requests from RC machines 312. As shown, each PF request is preferably accompanied by (or includes) a confidence score indicating the probability that the data requested by the prefetch request will be subsequently accessed by a future demand request of processor core 200. In some embodiments, the confidence score can be generated by an unillustrated prefetch unit in the processor core 200 that establishes various streams of prefetch requests and maintains, for each prefetch stream, a respective stream history indicating which prefetched cache lines are subsequently accessed by demand requests of the processor core 200. In response to unillustrated select signals generated by arbiter 305, multiplexer M1 selects one of its input requests to forward to multiplexer M2, which additionally receives as an input a remote request received from local interconnect 314 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

A request selected for processing by arbiter 305 is placed by multiplexer M2 into dispatch pipeline 306. Dispatch pipeline 306 preferably is implemented as a fixed duration pipeline in which each of multiple possible overlapping requests A, B, C, etc. is processed for a predetermined number of clock cycles. For example, dispatch pipeline 306 may process each request for four cycles.

During a first cycle of processing within dispatch pipeline 306, a 1-cycle directory read (lookup) is performed utilizing the request address to determine if the request address hits or misses in directory 308, and if the memory address hits, the cache state of the memory block within directory 308. The directory information, which includes a hit/miss indication and the cache state of the memory block, is returned by directory 308 to dispatch pipeline 306 in a subsequent cycle, such as the fourth cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 100, may entail communication of a memory access request on local interconnect 114, as discussed further below.

At a predetermined time during processing of the memory access request within dispatch pipeline 306, arbiter 305 transmits the request address to cache array 302 via address and control path 330 to initiate a cache read of the memory block specified by the request address. A cache read takes 2 cycles in the exemplary embodiment. The memory block read from cache array 302 is transmitted via data path 342 to error correcting code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 make a dispatch determination. For example, dispatch pipeline 306 may make the dispatch determination based upon a number of criteria, including (1) the presence of an address collision between the request address and a previous request address currently being processed by a CO machine 310, SN machine 311, RC machine 312, or PF machine 313, (2) the directory information, and (3) availability of an RC machine 312 (for a local LD or ST request of the affiliated processor core 200), PF machine 313 (for a local PF request of the affiliated processor core 200), or SN machine 311 (for a snooped request of a remote processor core) to process the memory access request. If dispatch pipeline 306 makes a dispatch determination that the memory access request is to be dispatched, the memory access request is dispatched from dispatch pipeline 306 to an RC machine 312, PF machine 313, or a SN machine 311, as appropriate. If the memory access request fails dispatch, the failure is signaled to the requestor (e.g., local or remote processor core 200) by a retry coherence response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. A directory write and a cache write may be scheduled by arbiter 305 during any interval in which dispatch pipeline 306 is not already processing other requests according to the fixed scheduling of directory reads and cache reads. When all operations for the given request have been completed, the RC machine 312 returns to an unbusy or idle state. It will be appreciated that the scheduling of non-fixed-schedule operations such as directory writes and cache writes can impact the scheduling of other operations, including those processed according to a fixed schedule.

As noted above, the processing performed by CO machines 310, SN machines 311, RC machines 312, and PF machines 313 may require a memory access command to be issued on the system fabric of data processing system 100. For example, CO machines 310 may issue CO commands, RC machines 312 may issue, among other things, read-type and store-type commands, PF machine 313 may issue prefetch read commands, and SN machines 311 may issue push commands. Commands of CO machines 310, SN machines 311, RC machines 312, and PF machine 313 are all received and ordered for presentation on the system fabric by an outbound command arbiter 357. Command arbiter 357 additionally issues a request for permission to issue each command on the system fabric, and in response to receipt of an acknowledgement, issues the command.

As discussed further below, the various commands issued on the system fabric of data processing system 100 by coherence participants such as machines 310, 311, 312, and 313 of L2 cache 230 can have different scopes of broadcast including differing sets of coherence participants. For example, although alternative or additional scopes of broadcast can be implemented, in at least some embodiments, the broadcast scopes among which a coherence participant can select for a command include at least a node scope including all the coherence participants in a particular node 102, a group scope including all the coherence participants in a subset of the nodes 102, and a global scope including all coherence participants in all nodes 102 in data processing system 100. In at least some embodiments, L2 cache 230 additionally includes a scope predictor 325 that selects an initial broadcast scope of each command issued by L2 cache 230 based, for example, on the type of the request and historical data access patterns.

In order to manage congestion on the system fabric, each L2 cache 230 is also preferably configured to control the rate at which the L2 cache 230 issues requests for permission to issue commands onto the system fabric. In accordance with one aspect of the inventions disclosed herein, control of the rate of issuance of requests for permission to issue commands onto the system fabric is preferably implemented by individual state machines 310, 311, 312, and 313 based on the issuance rates established for each scope of broadcast by rate commands, as discussed further below. The current issuance rate for requests for permission to issue commands onto the system fabric for each respective scope of broadcast can be buffered in L2 cache 230, for example, in node rate register 370, group rate register 372, and global rate register 374.

Those skilled in the art will appreciate that the rates at which commands are issued on the system fabric can also be controlled by unillustrated control logic forming a portion of the system fabric. As is known in the art, such control logic can, for example, reduce the rate of issuance of requests for permission to issue commands onto the system fabric by delaying the acknowledgements of previous requests. Given the finite number of allowed outstanding requests, delaying acknowledgements has the effect of reducing the rate of command issuance on the system fabric. Those skilled in the art will appreciate that requests for permission to issue commands onto the system fabric consume some of the limited queuing resource of the system fabric, and it would be advantageous to prevent excess requests by the masters limiting their issuance of such requests.

Figure 4:
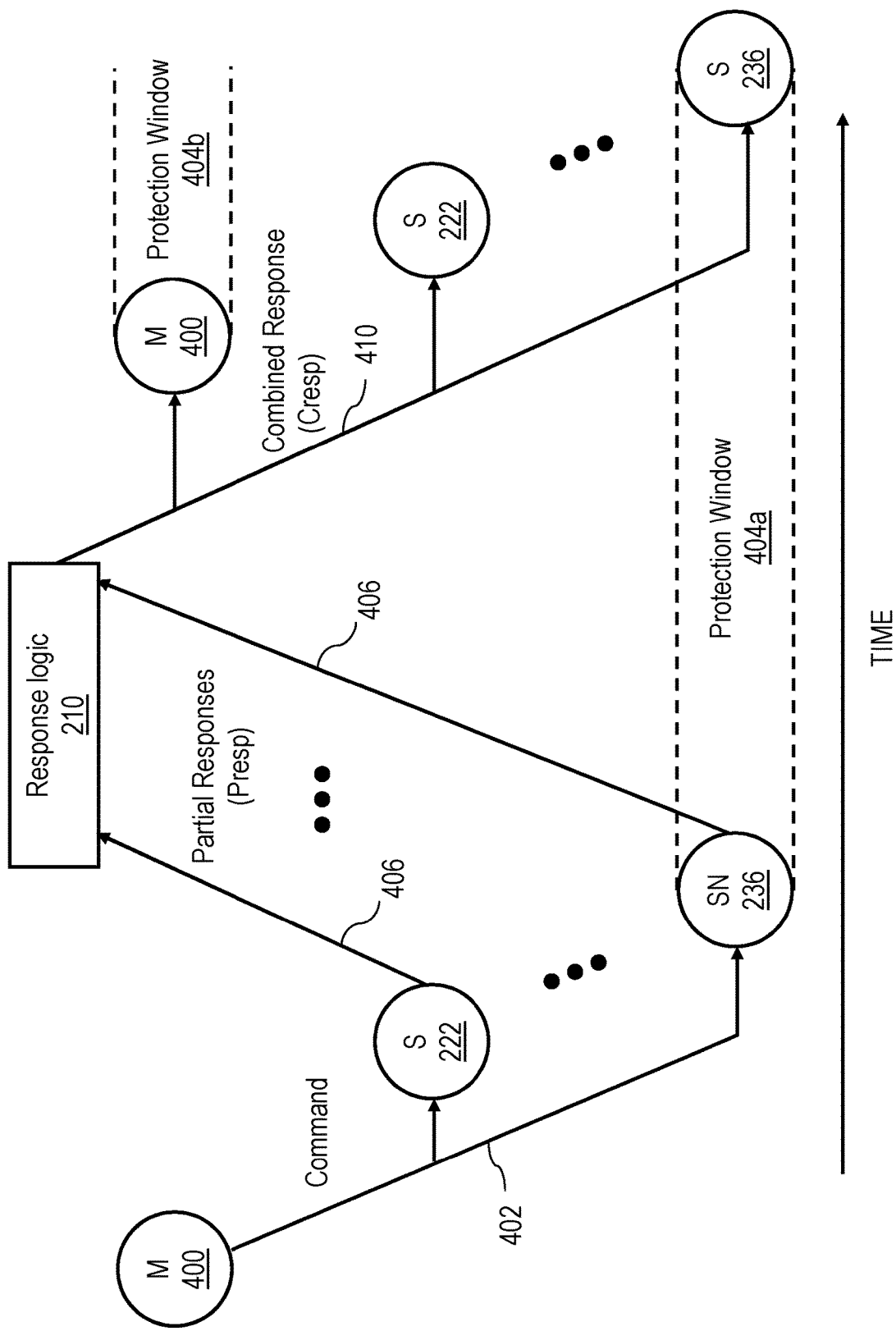
FIG. 4 is a time-space diagram of an exemplary operation on the interconnect fabric of the data processing system of FIG. 1.

Referring now to FIG. 4, there is depicted a time-space diagram of an exemplary interconnect operation on a local or system interconnect 110, 114 of data processing system 100 of FIG. 1. As noted above, prior to the initiating an operation on the system fabric, a master 400 (e.g., a CO machine 310, SN machine 311, RC machine 312, or PF machine 313) first issues a request for permission to initiate a command onto the system fabric. In response to this request, command arbiter 357 issues the request on the system fabric. In response to receipt from the system fabric of an acknowledgement granting permission to initiate the operation, command arbiter 357 provides the acknowledgement to the requesting master 400, possibly after a delay imposed by arbiter 357. In response to receipt of the acknowledgement, the master 400 issues a command 402 of the operation on a local interconnect 114 and/or system interconnect 110 of data processing system 100. Command 402 preferably includes a transaction type indicating a type of desired access and a resource identifier (e.g., target real address) indicating a resource to be accessed. Common types of commands preferably include those set forth below in Table I.

TABLE 1

| Command | Description |
| --- | --- |
| READ | Requests a copy of the image of a memory block for query purposes (including prefetching) |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests destruction of all cached copies of a memory block and authority to update the memory block in system memory |

Command 402 is received by the SN machines 236 of L2 caches 230, as well as the snoopers 222 of memory controllers 206 (FIG. 1). In general, with some exceptions, the SN machines 236 in the same L2 cache 230 as an RC machine 232 that initiates a command 402 do not snoop that command 402 (i.e., there is generally no self-snooping) because a command 402 is transmitted on local interconnect 114 and/or system interconnect 110 only if the command 402 cannot be serviced internally by a processing unit 104. Snoopers 222 or SN machines 236 that receive command 402 may provide a respective partial response (Presp) 406 representing the response of at least that snooper to command 402. A snooper 222 within a memory controller 206 determines the partial response 406 to provide based, for example, on whether BAR logic 240 indicates the memory controller 206 is responsible for the target real address and whether snooper 222 has resources available to service the command 402. An L2 cache 230 may determine its partial response 406 based on, for example, the availability of its L2 directory 238, the availability of a resources to handle the command 402 (including an available SN machine 236), and the cache state associated with the target real address in L2 directory 238. In preferred embodiments, an instance of fabric control logic 212 that receives a command 402 for forwarding may also provide a special Retry_overrun partial responses 406 in cases in which the fabric control logic 212 is unable to forward the command 402 due to a lack of available bandwidth on the system fabric.

The partial responses of snoopers 222 and 236 and, if provided, fabric control logic 212, are logically combined either in stages or all at once by one or more instances of response logic 210 to determine a system-wide combined response (Cresp) 410 to command 402. Subject to the scope restrictions discussed below, response logic 210 provides combined response 410 to master 400 and snoopers 222, 236 via its local interconnect 114 and/or system interconnect 110 to indicate the system-wide response (e.g., Success, Retry, etc.) to command 402. If combined response 410 indicates success of command 402, combined response 410 may indicate, for example, a data source for a requested memory block, a cache state in which the requested memory block is to be cached by master 400, and whether "cleanup" operations invalidating the requested memory block in one or more caches 226, 230 are required. In the case in which at least one instance of fabric control logic 212 provides a Retry_overrun partial response 406, response logic 210 preferably provides a Retry_overrun combined response 410 indicating that the command 402 could not be successfully communicated to the full extent of the selected scope of broadcast due to lack of available bandwidth (i.e., congestion) on the relevant portion of the system fabric.

In response to receipt of a combined response 410 indicating success, one or more of master 400 and snoopers 222, 236 typically perform one or more operations in order to service command 402. These operations may include supplying data to master 400, invalidating or otherwise updating the cache state of data cached in one or more L2 caches 230, performing castout operations, writing back data to a system memory 108, etc. If required by command 402, a requested or target memory block may be transmitted to or from master 400 before or after the generation of combined response 410 by response logic 210. If the combined response 410 indicates Retry, the master 400 may reissue the command 402 at a later time, possibly with a different scope of broadcast, as described further below.

The partial response provided by a snooper 222, 236 in response to a command 402 and the operations performed the snooper in response to the command 402 and/or its combined response will be described with reference to whether that snooper is a Highest Point of Coherency (HPC), a Lowest Point of Coherency (LPC), or neither with respect to the target real address specified by the command 402. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical command 402 in the data processing system embodiment of FIGS. 1 and 2, the LPC will be the memory controller 206 for the system memory 108 serving as a repository for the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a shared copy of the memory block to a master 400 in response to a command 402 that does not modify the memory block. Thus, for a typical command 402 in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache state(s) within the L2 directory 238 of an L2 cache 230, as described further below with reference to Table II.

Still referring to FIG. 4, the HPC, if any, for a memory block referenced in a command 402, or in the absence of an HPC, the LPC of the memory block, preferably has the responsibility of protecting the transfer of ownership of a memory block in response to a command 402 during a protection window 404a. In the exemplary scenario shown in FIG. 4, the snooper 236 that is the HPC for the memory block specified by the target real address of command 402 protects the transfer of ownership of the requested memory block to master 400 during a protection window 404a that extends at least from the time that snooper 236 determines its partial response 406 until snooper 236 receives combined response 410 (and possibly thereafter). During protection window 404a, snooper 236 protects the transfer of ownership by providing partial responses 406 (e.g., Retry Presps) to other commands specifying the same target real address that prevent other masters from obtaining ownership until ownership has been successfully transferred to master 400. Master 400 likewise initiates a protection window 404b to protect its ownership of the memory block requested in command 402 following receipt of combined response 410.

Because snoopers 222, 236 all have limited resources for handling the CPU and I/O commands described above, several different levels of partial responses and corresponding combined responses are possible. For example, if a snooper 222 within a memory controller 206 that is responsible for a requested memory block has a queue available to handle a command 402, the snooper 222 may respond with a partial response indicating that it is able to serve as the LPC for the request. If, on the other hand, the snooper 222 has no queue available to handle the command 402, the snooper 222 may respond with one or more partial responses (e.g., LPC_Ack and Retry) indicating that is the LPC for the memory block, but is unable to currently service the command 402. Similarly, an L2 cache 230 may require an available SN machine 236 and access to L2 directory 302 in order to handle a snooped command 402. Absence of access to either (or both) of these resources results in a partial response (and corresponding CR) signaling an inability to service the command 402 due to absence of a required resource (e.g., a Retry).

Conventional broadcast-based data processing systems handle both cache coherency and data delivery through broadcast communication, which, in at least some conventional systems, is globally transmitted on an interconnect fabric to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the interconnect fabric is multiplied, meaning that system cost rises sharply with system scale as more bandwidth is required for communication over the interconnect fabric. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce traffic volume while still maintaining a broadcast-based coherency mechanism, preferred embodiments of the present invention implement coherency domains, which can conveniently be (but are not required to be) implemented with each node 102 forming a separate coherency domain. For the purposes of the explaining exemplary operation of data processing system 100, it will hereafter be assumed that all coherency domains have boundaries defined by sets of one or more nodes 102.

The implementation of coherency domains reduces system traffic by limiting inter-domain broadcast communication over system interconnect 110 in cases in which commands 402 can be serviced with participation by fewer than all coherency domains. For example, if processing unit 104*a* of node 102*a* has a READ operation to issue, then processing unit 104*a* may elect to first broadcast the READ operation to all coherence participants within its own coherency domain (e.g., node 102*a*), but not to coherence participants in other coherency domains (e.g., node 102*n*). A broadcast operation transmitted to only those coherence participants within the same coherency domain as the master of the operation is defined herein as a "local node operation" having a "local node" scope of broadcast. If the local READ operation can be serviced within solely the coherency domain of processing unit 104*a*, then no further broadcast of the READ command need be or is performed. If, however, the partial responses and combined response to the local READ command indicate that the READ command cannot be serviced solely within the local coherency domain of node 102*a*, the scope of the broadcast may then be extended to include, in addition to the local coherency domain, one or more additional coherency domain(s).

In addition to a "local node" scope, data processing system 100 preferably supports a "global" scope 501 including all of the coherency domains in the SMP data processing system, as shown in FIG. 5A. Thus, an operation that is transmitted to all coherency domains in an SMP data processing system is defined herein as a "global operation". Of course, one or more supersets of the local broadcast scope can be defined intermediate the local scope and the global scope. For example, FIG. 5A illustrates an embodiment in which data processing system 100 optionally implements a plurality of node groups, where an operation broadcast from one node 102 to all nodes 102 within the node group defines an operation of "group" scope (e.g., one of group scopes 503*a*, 505*b* or 503*c*).

In a preferred embodiment, the possible broadcast scopes for an operation additionally include a "remote" scope, which is defined to include the local coherency domain (e.g., the local node 102) containing the master that initiates the operation and a single other remote coherency domain (e.g., a remote node 102), while excluding at least one other peer coherency domain (e.g., a node 102 other than the local and remote nodes 102). It should be noted that the local coherency domain, the remote coherency domain, and the peer coherency domain are non-overlapping in scope. For example, FIG. 5A explicitly illustrates two of the possible remote scopes for local node 102, which are identified as remote scope 505*a* and remote scope 505*b*, respectively.

Depending on the structure of the system fabric, some embodiments of data processing system 100 may also support a "remote node only" scope that transmits at least a subset of memory access commands (e.g., castout requests and push commands) to a single remote node without being snooped by coherence participants in the local node 102. For ease of understanding, it will hereafter be assumed that data processing system 100 supports the local node scope, remote scope, group scope, and global scope, but does not support the "remote node only" scope. Upon reference to the following discussion, those skilled in the art will appreciate the modifications to the disclosed embodiments that would be required or useful to additionally support the "remote node only" scope of broadcast.

In a preferred embodiment, the scope of an operation is indicated within each of the component messages of an interconnect operation by a scope indicator (signal). Fabric control logic 212 within processing units 104 preferably determines whether or not to forward an operation received via local interconnect 114 onto system interconnect 110 based upon the setting of the scope indicator (signal) in the interconnect operation.

In order to limit the issuance of unneeded global operations and thereby reduce operational latency and conserve additional bandwidth on local interconnects, the present invention preferably implements a domain indicator per memory block that indicates whether or not a copy of the associated memory block may be cached outside of the local coherency domain. For example, FIG. 5B depicts an exemplary implementation of a domain indicator in accordance with one embodiment. As shown in FIG. 5B, a system memory 108, which may be implemented, for example, in dynamic random access memory (DRAM), static RAM, flash memory, or other memory technology, stores a plurality of memory blocks 500. System memory 108 stores in association with each memory block 500 an associated error correcting code (ECC) 502 utilized to correct errors, if any, in memory block 500 and a memory domain indicator (MDI) 504. Although in some embodiments of the present invention, MDI 504 may identify a particular coherency domain (i.e., specify a coherency domain or node ID), it is hereafter assumed that memory domain indicator (MDI) 504 is a 1-bit flag that is set (e.g., to '1' to indicate "local") if the associated memory block 500 is cached, if at all, only within the same coherency domain as the memory controller 206 serving as the LPC for the memory block 500. An MDI 504 is reset (e.g., to '0' to indicate "global") otherwise. The setting of MDI bits 504 to indicate "local" may be implemented imprecisely in that a false setting of "global" will not induce any coherency errors, but may cause unneeded global broadcasts of operations.

Importantly, memory controllers 206 that source a memory block in response to a command 402 preferably transmit the associated MDI 504 in conjunction with the requested memory block. It should also be appreciated that a multiplicity of interconnect operations of various scopes can be "in flight" in data processing system 100 at any given time.

Data processing system 100 preferably implements a cache coherency protocol designed to leverage the implementation of coherency domains as described above. In a preferred embodiment, the cache states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a command, (4) whether the cached image of the memory block is consistent with the corresponding memory block at the LPC (system memory), and (5) whether another cache outside the local coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache State | HPC? | Unique? | Can allow cache to serve as data source? | Consistent with LPC? | Cached outside local domain? | Legal concurrent states |
|---|---|---|---|---|---|---|
| M | Yes | Yes | yes, before Cresp | No | no | I, Ig (& LPC) |
| Me | yes | yes | yes, before Cresp | yes | no | I, Ig (& LPC) |
| T | yes | unknown | yes, after Cresp if none provided before Cresp | no | unknown | Sr, S, I, Ig (& LPC) |
| Tn | yes | unknown | yes, after Cresp if none provided before Cresp | no | no | Sr, S, I, Ig (& LPC) |
| Te | yes | unknown | yes, after Cresp if none provided before Cresp | yes | unknown | Sr, S, I, Ig (& LPC) |
| Ten | yes | unknown | yes, after Cresp if none provided before Cresp | yes | no | Sr, S, I, Ig (& LPC) |
| Sr | no | unknown | yes, before CR | unknown | unknown | T, Tn, Te, Ten, S, I, Ig (& LPC) |
| S | no | unknown | no | unknown | unknown | T, Tn, Te, Ten, Sr, S, I, Ig (& LPC) |
| I | no | n/a | no | n/a | unknown | M, Me, T, Tn, Te, Ten, Sr, S, I, Ig (& LPC) |
| Ig | no | n/a | no | n/a | Assumed so, in absence of other information | M, Me, T, Tn, Te, Ten, Sr, S, I, Ig (& LPC) |

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a master in another coherency domain in response to an exclusive access command (e.g., a RWITM). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency node in response to an exclusive access command.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access command caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a command that causes a memory block to be loaded into a cache hits on an Ig cache entry in that same cache, the cache treats the Ig hit as a cache miss and performs a castout operation with the matching Ig entry as the selected victim. The cache thus avoids avoid placing two copies of the same address tag in the cache directory. Third, the castout of the Ig state is preferably performed as a local operation, or if performed by a remote master, is ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is updated to "global" at the LPC (if local to the cache performing the castout).

Implementation of an Ig state improves communication efficiency by maintaining a cached domain indicator for a memory block in a coherency domain even when no valid copy of the memory block remains cached in the coherency domain. As a consequence, an HPC for a memory block can service an exclusive access command (e.g., a snooped RWITM) from a remote coherency domain without retrying the exclusive access command and performing a push of the requested memory block to the LPC.

In a typical implementation of the system fabric of data processing system 100, the bandwidth available on the system fabric for memory access operations varies inversely with the broadcast scope. Thus, for example, broadcasts of the local node scope have the greatest available bandwidth, then the remote scope, and then the group scope, with the system scope having the least available bandwidth. Consequently, system performance and resource utilization are improved if masters issue memory access operations with as limited of scope as necessary to successfully complete the memory access operations. The implementation of MDI bits 504 and cache states as described above provide enough information for a master to determine if a memory block may have left the "home node" in which the LPC for the memory blocks resides. In at least some embodiments, data processing system 100 additionally implements an unillustrated coarse coarse-grained memory coherence directory (MCD) per group scope 503 to additionally track whether a memory block having a target real address assigned to a LPC within the group scope 503 is likely cached outside of that group scope 503.

Based on scope information provided by the MDI bit 504, the cache states, and the MCDs, a master that initiates a memory access operation on the system fabric can initially cause the memory access operation to be issued with a more restricted scope of broadcast in which the memory access operation can possibly or likely be serviced in accordance with the coherence protocol. If the initial scope of broadcast turns out to include less than all of the coherence participants necessary to maintain coherence while servicing the memory access operation (e.g., due to the target memory block being cached in a node 102 outside the initial broadcast scope), that fact is communicated back to the master in a Retry Cresp indicating that the memory access operation should be reissued with a larger scope of broadcast. The master, in response to receipt of such as Retry Cresp, can then cause the memory access operation to be reissued one or more times with one or more increased scopes of broadcast until the memory access operation can be successfully completed in accordance with the coherence protocol.

Referring now to FIG. 6, there is depicted a more detailed block diagram of an example of fabric control logic 212 of FIG. 2 in accordance with one embodiment. In this example, each processing node 102 includes one instance of fabric control logic 212 configured to serve as the node rate master that controls the issuance rate of requests for permission to issue, onto the system fabric, operations of node scope on behalf of masters 400 within that node. Similarly, one instance of fabric control logic 212 in each group scope 503 (i.e., preferably one of the node rate masters) is configured to serve as the group rate master that controls the issuance rate of requests for permission to issue operations of group scope on behalf of masters 400 within that group scope 503. In addition, one instance of fabric control logic 212 in global scope 503 (i.e., preferably one of the global rate masters) is configured to serve as the global rate master that controls the issuance rate for permission to issue operations of global scope on behalf of all masters 400 within global scope 501. In the depicted example, the particular instance of fabric control logic 212 serving as the global rate master can be designated, for example, by system hardware, firmware, or software setting (e.g., to 1) a global rate master flag 612 at startup. The instances of fabric control logic 212 serving as group rate masters can be designated, for example, by system hardware, firmware, or software setting (e.g., to 1) their group rate master flags 614. The instances of fabric control logic 212 only serving as node rate masters will then have both global rate master flag 612 and group rate master flag 614 reset at startup (e.g., to 0).

In the illustrated embodiment, fabric control logic 212 includes overcommit control logic 600 that monitors the system fabric for Retry_overrun Cresps and accumulates separate counts of Retry_overrun Cresps for commands of each broadcast scope originating within the node containing fabric control logic 212. For example, overcommit control logic 600 accumulates a count of Retry_overrun Cresps for operations of global scope in global scope counter 602, accumulates a count of Retry_overrun Cresps for operations of group scope in group scope counter 604, and accumulates a count of Retry_overrun Cresps for operations of node scope in node scope counter 606. To maintain running average values in counters 602-606, fabric control logic 212 includes a decay interval timer 608 by reference to which overcommit control logic 600 periodically decreases the count values in counters 602, 604, and 606. Counters 602, 604, and 606 are all preferably incremented and decremented in saturating fashion.

In the depicted example, fabric control logic 212 additionally includes a report interval timer 610 by reference to which the overcommit control logic 600 of each instances of fabric control logic 212 not serving as a group rate master or global rate master periodically reports the count value accumulated in its group scope counter 604 and global scope counter 602 to the group rate master and the global rate master, respectively, via special count report commands issued on the system fabric. Overcommit control logic 600 preferably sends these count report commands because the implemented coherency protocol may not guarantee that the instances of fabric control logic 212 serving as the group rate masters and the global rate master receive every combined response of operations of their assigned broadcast scope.

Figure 7:
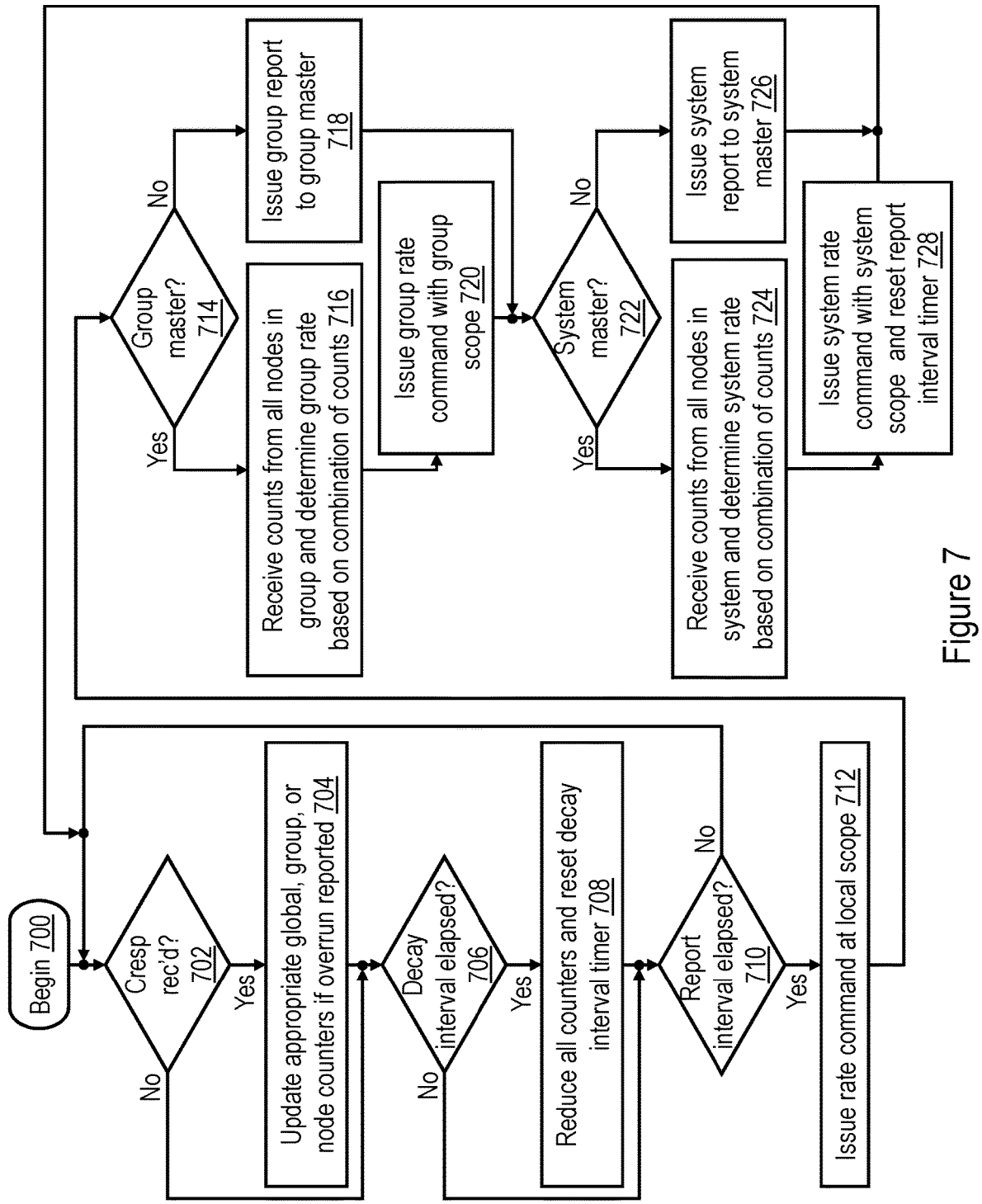
FIG. 7 is a high-level logical flowchart of an exemplary process by which a rate master controls the rate of issuance of requests for one or more scopes of broadcast based on reported overrun counts in accordance with one embodiment.

With reference now to FIG. 7, there is illustrated a high-level logical flowchart of an exemplary process by which a rate master controls the rate of issuance of requests for one or more scopes of broadcast based on reported overrun counts in accordance with one embodiment. An instance of the illustrated process is preferably performed by each instance of fabric control logic 212, whether serving as a node rate master, group rate master, and/or system rate master.

The process of FIG. 7 begins at block 700 and then proceeds to block 702, which illustrates overcommit control logic 600 of fabric control logic 212 monitoring the system fabric of data processing system 100 for receipt of a combined response of a system fabric operation originating within the node 102 containing the present instance of fabric control logic 212. In response to not detecting a combined response in the present cycle, the process proceeds to block 706, which is described below. If, however, overcommit control logic 600 detects a combined response in the present cycle, overcommit control logic 600 determines if the combined response is a Retry_overrun combined response, and if so, increments the counter 602, 604, or 606 corresponding to the scope of the operation (which is preferably indicated in a field of the combined response) (block 704). The process then proceeds to block 706. At block 706, overcommit control logic 600 determines whether or not the count value of decay interval timer 608 indicates that a decay interval has elapsed. For example, if decay interval timer 608 is implemented as a countdown timer, overcommit control logic 600 may determine at block 706 has a value of 0. In response to a determination at block 706 that the decay interval has not elapsed, the process proceeds to block 710, which is described below. If, however, overcommit control logic 600 determines at block 706 that the decay interval has elapsed, the process passes to block 708, which illustrates overcommit control logic 600 reducing the count value of each of counters 602-606, for example, by subtracting a fixed amount, shifting the count value to the right a predetermined number of bits, etc. In addition, at block 708, overcommit control logic 600 resets decay interval timer 608 to an initial value and begins timing the next decay interval. The process then proceeds to block 710.

Block 710 illustrates overcommit control logic 600 determining whether or not the count value of report interval timer 610 indicates that a report interval has elapsed. If not, the process of FIG. 7 returns to block 702, which has been described. If, however, overcommit control logic 600 determines at block 710 that a report interval has elapsed (e.g., report interval timer 610 has a value of 0), overcommit control logic 600 issues on the system fabric of data processing system 100 a rate command with node scope of broadcast (block 712). As will be appreciated from the foregoing, issuance of a command at block 712 (and similarly at blocks 718, 720, 726, 728 of FIG. 7, block 1014 of FIG. 10, and block 1116 of FIG. 11) includes the substeps of issuing, on the system fabric, a request for permission to issue a command on the system fabric, awaiting an acknowledgement from the system fabric granting permission to issue the command, and then issuing the command. In one embodiment, the rate command issued at blocks 712, 720, and/or 728 may have the form shown in FIG. 8.

Figure 8:
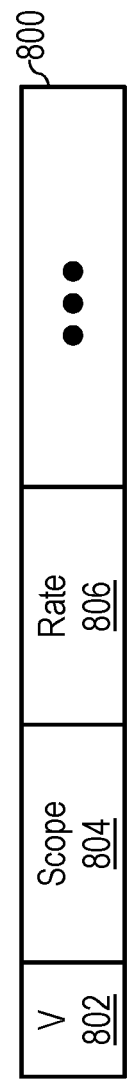
FIG. 8 depicts an exemplary rate command issued by a rate master in accordance with one embodiment.

In the embodiment depicted in FIG. 8, a rate command 800 includes a number of fields, including a valid field 802 indicating whether or not the remainder of the contents of rate command 800 are valid, a scope field 804 indicating a broadcast scope of rate command 800 on the system fabric (e.g., node, group, or global), and a rate field 806 specifying a value indicative of a rate at which masters 400 in the broadcast scope indicated in scope field 804 (determined relative to the issuing instance of fabric control logic 212) can issue requests for permission to issue a command on the system fabric. As will be appreciated, the value specified in rate field 806 of rate command 800 can be expressed in a variety of different ways. For example, in some embodiments, rate field 806 may simply contain the value of the relevant one of counters 602-606. In this case, the request issuance rate of masters 400 is inversely related to the value specified in rate field 806, meaning that the higher the count value is, the fewer requests of the broadcast scope specified in scope field 804 that masters 400 are permitted to issue in a given interval. In other embodiments, overcommit control logic 600 may instead utilize rate field 806 to specify a maximum number of requests that may be issued by any master 400 in a given interval. In this case, the request issuance rate of masters 400 is directly related to the value specified in rate field 806. Of course, these examples are non-exhaustive and other ways of specifying a request issuance rate could alternatively be employed.

Returning to FIG. 7, following block 712, the process proceeds to block 714, which illustrates overcommit control logic 600 determining by reference to its group rate master flag 614 whether or not it is designated to serve as the group rate master for masters 400 within its group scope 503. If not, overcommit control logic 600 issues, on the system fabric with a group scope of broadcast, a count report command specifying the count value of its group scope counter 604 (block 718). The process then passes to block 722, which is described below. If, however, overcommit control logic 600 determines at block 714 that group rate master flag 614 is set to designate overcommit control logic 600 as the group rate master for masters 400 within its group scope 503, the process proceeds to block 716. Block 716 depicts overcommit control logic 600 receiving, via the system fabric, the group count report commands of each other node rate master within its group scope 503. As further illustrated at block 716, once all such count report commands have been received, overcommit control logic 600 determines, based on the count values reported in the count report commands and the count value of its own group scope counter 604, the issuance rate for requests of group scope for all masters 400 in its group scope 503. For example, in one embodiment, overcommit control logic 600 may average the count value of its group scope counter 604 with the count values received in the count report commands to obtain a group rate of request issuance based on the average of the count values. Overcommit control logic 600 then issues, on the system fabric with a group scope of broadcast, a group rate command 800 that specifies within rate field 806 the rate of request issuance of requests of group scope determined at block 716 (block 720). The process then proceeds to block 722.

Block 722 illustrates overcommit control logic 600 determining by reference to its global rate master flag 612 whether or not it is designated to serve as the global rate master for all masters 400 within global scope 501. If not, overcommit control logic 600 issues, on the system fabric with a global scope of broadcast, a global count report command specifying the count value of its global scope counter 602 (block 726). The process then passes to block 722, which is described below. If, however, overcommit control logic 600 determines at block 722 that global rate master flag 612 is set to designate overcommit control logic 600 as the global rate master for all masters 400 within global scope 501, the process proceeds to block 724. Block 724 depicts overcommit control logic 600 receiving, via the system fabric, the global count report commands of each other node rate master within global scope 501. As further illustrated at block 724, once all such global count report commands have been received, overcommit control logic 600 determines, based on the count values reported in the global count report commands and the count value of its own global scope counter 602, the issuance rate for requests of global scope for all masters 400 within global scope 501. Again, in at least some embodiments, overcommit control logic 600 can determine the rate of request issuance of requests of global scope based on the average of the global count values. Overcommit control logic 600 then issues, on the system fabric with a global scope of broadcast, a global rate command 800 that specifies within rate field 806 the rate of request issuance for requests of global scope determined at block 724 (block 728). Following block 726 or block 728, the process of FIG. 7 returns to block 702, which has been described.

Figure 9:
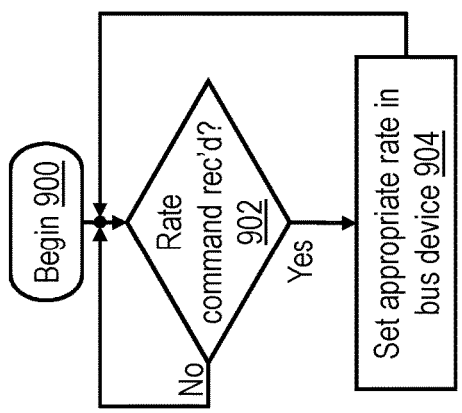
FIG. 9 is a high-level logical flowchart of an exemplary process for setting the request issuance rate of a master based on the rate command of a rate master in accordance with one embodiment.

With reference now to FIG. 9, there is illustrated a high-level logical flowchart of an exemplary process for setting the request issuance rate of a master based on the rate command of a rate master in accordance with one embodiment. The process of FIG. 9 begins at block 900 and then proceeds to block 902, which illustrates overcommit control logic 600 of an instance of fabric control logic 212 monitoring the system fabric for rate commands 800, which in the described example, may include node rate commands, group rate commands, and global rate commands. If no rate command 800 is snooped on the system fabric, the process continues to iterate at block 902. If, however, overcommit control logic 600 detects receipt of a rate command 800, then overcommit control logic 600 sets the relevant request issuance rate for a bus device (block 904). For example, for an L2 cache 230, overcommit control logic 600 selects the relevant one of node rate register 370, group rate register 372, and global rate register 374 based on the scope field 804 of the rate command 800 and then updates the selected register with the rate indicated in rate field 806 of the rate command 800. Following block 904, the process of FIG. 9 returns to block 902, representing the overcommit control logic 600 continuing to monitor the system fabric for rate commands 800.

Figure 10:
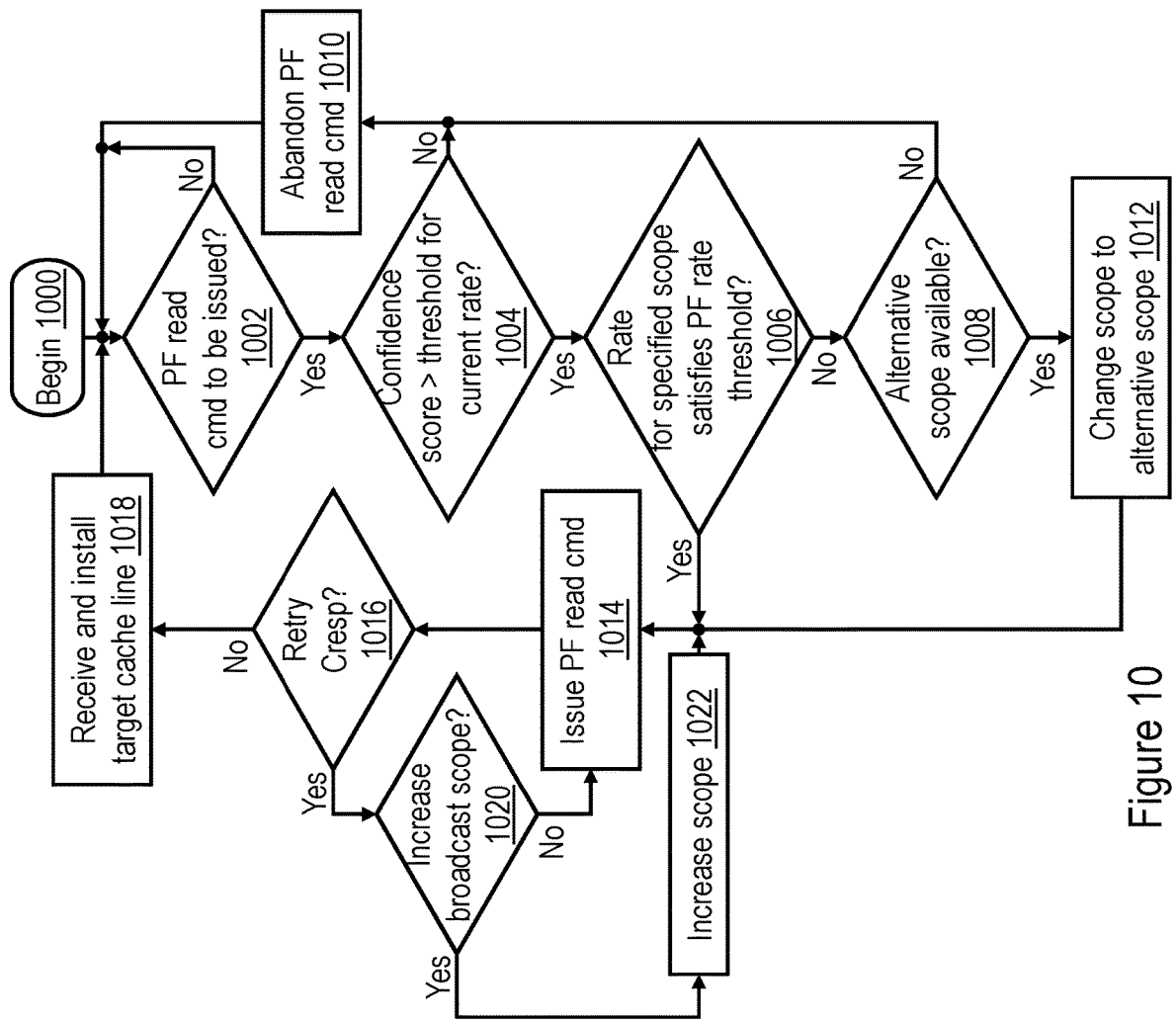
FIG. 10 is a high-level logical flowchart of an exemplary process by which a coherence participant issues an abandonable command (e.g., a prefetch read command) on the system fabric of a data processing system in accordance with one embodiment.

Referring now to FIG. 10, there is depicted a high-level logical flowchart of an exemplary process by which a master 400 issues an abandonable command on the system fabric of a data processing system in accordance with one embodiment. Although various abandonable commands can be issued by various masters 400, in the following discussion it will be assumed for ease of understanding that the abandonable command is a prefetch read command and that the master 400 is a PF machine 313. An instance of the illustrated process can be performed concurrently by each of the PF machines 313 in data processing system 100.

The process of FIG. 10 begins at block 1000 and then proceeds to block 1002, which illustrates a determination by the PF machine 313 whether or not a prefetch read command is to be potentially issued on the system fabric in order to obtain a copy of a cache line that is likely to be accessed in the future by the affiliated processor core 200 and buffer the cache line in the associated L2 cache array 302. PF machine 313 may determine at block 1002 that a prefetch read command is potentially to be issued on the system fabric, for example, in response to dispatch, to the PF machine 313, of a prefetch request of the affiliated processor core 200 that missed in L2 directory 308 (and the confidence score associated with the prefetch request). If PF machine 313 makes a negative determination at block 1002, the process simply iterates at block 1002. If PF machine 313 makes an affirmative determination at block 1002, PF machine 313 accesses a broadcast scope for the prefetch read command generated by scope predictor 325 (e.g., node, group, or global scope) and additionally determines at block 1004 whether or not the confidence score associated with the prefetch read command is greater than a rate-dependent threshold that is dependent upon the rate specified for the broadcast scope in one of rate registers 370-374. The determination depicted at block 1004 is employed to ensure that prefetch read commands, which are inherently speculative, are not issued on the system fabric if the probability that the requested cache line will be accessed by the processor core 200 (as reflected in the confidence score) is too low for the current level of congestion on the system fabric. In response to a negative determination at block 1004, the process of FIG. 10 passes to block 1010, which illustrates PF machine 313 abandoning the prefetch read command (thus refraining from issuing it on the system fabric) and returning to an idle state. Thereafter, the process of FIG. 10 returns to block 1002, which has been described.

Referring again to block 1004, in response to a determination that the confidence score associated with the prefetch read command is greater than a rate-dependent threshold for the selected broadcast scope of broadcast, PF machine 313 additionally determines at block 1006 whether or not the rate specified for the relevant broadcast scope in one of rate registers 370-374 satisfies a prefetch rate threshold at which a prefetch read command may be issued on the system fabric. For example, in some embodiments, a respective prefetch rate threshold is predetermined for each broadcast scope, and PF machine 313 determines at block 1006 whether the rate in the relevant one of rate registers 370-374 is below the predetermined prefetch rate threshold. In response to an affirmative determination at block 1006, the process passes to block 1014, which is described below. If, however, PF machine 313 makes a negative determination at block 1006, PF machine 313 additionally determines at block 1008 whether or not an alternative scope of broadcast can be used, for example, because the rate specified for a different broadcast scope in one or more of rate registers 370-374 satisfies the prefetch rate threshold at which a prefetch read command may be issued for that alternative broadcast scope. At block 1008, if multiple prefetch rate thresholds are satisfied, the PF machine 313 can select either a larger scope of broadcast or smaller scope of broadcast than the scope of broadcast indicated by scope predictor 325. If multiple alternative scopes of broadcast can be selected, PF machine 313 preferably makes a selection among the possible alternative broadcast scopes based on one or more criteria, including which alternative broadcast scope has the least congestion. PF machine 313 also preferably biases its selection of an alternative broadcast scope toward the selection of a larger scope of broadcast, if possible. If PF machine 313 determines at block 1008 that no alternative scope of broadcast is available, the process of FIG. 10 passes to block 1010, which has been described. If, however, PF machine 313 makes an affirmative determination at block 1008, PF machine 313 changes the selected scope of broadcast of the prefetch read command to the preferred alternative scope (block 1012).

Referring now to block 1014, PF machine 313 issues a prefetch read command on the system fabric utilizing either the broadcast scope originally selected by scope predictor 325 or the alternative scope selected at blocks 1008 and 1012. As noted above with reference to block 712, issuance of the prefetch read command at block 1014 includes the substeps of issuing, on the system fabric, a request for permission to issue a command of the desired broadcast scope on the system fabric, awaiting an acknowledgement from the system fabric granting permission to issue the command, and then issuing the prefetch read command at the granted scope of broadcast. PF machine 313 then monitors for receipt of the combined response 410 for the prefetch read command, as shown at block 1016. If the combined response for the prefetch read command is other than a Retry combined response, thus indicating success of the prefetch read command, the process passes to block 1018, which illustrates L2 cache 230 receiving, via the system fabric, the target cache line requested by the prefetch read command, installing the target cache line in L2 cache array 302 (evicting an existing cache line, if necessary), and installing a corresponding entry in L2 directory 308. Thereafter, PF machine 313 is released to return to an idle state, and the process of FIG. 10 returns to block 1002, which has been described.

Returning to block 1016, in response to PF machine 313 determining that that combined response of the prefetch read command is a Retry combined response, PF machine 313 additionally determines at block 1020 whether or not to increase a scope of broadcast of the prefetch read command when reissued. For example, PF machine 313 may determine to increase the broadcast scope of the prefetch read command if the Retry combined response indicates that the Retry was due to a failure to locate the LPC of the target cache line and no other L2 cache 230 in the broadcast scope holds the target cache line in a coherence state conferring the authority to intervene a copy of the target cache line. Similarly, PF machine 313 may determine to increase the broadcast scope of the prefetch read command based on receipt of a Retry_overrun combined response indicating an inability of an instance of fabric control logic 212 to forward the prefetch read command due to congestion on the system fabric at the prior scope of broadcast. In response to a negative determination at block 1020, PF machine 313 reissues the prefetch read command on the system fabric with the prior scope of broadcast, as indicated by the process returning directly to block 1014. Alternatively, if PF machine 313 determines at block 1020 to increase the broadcast scope (e.g., from the node scope to the group or global scope or from the group scope to the global scope), PF machine 313 increases the broadcast scope to the best available broadcast scope at block 1022. Thereafter, the process proceeds to block 1014 and following blocks, which have been described.

Figure 11:
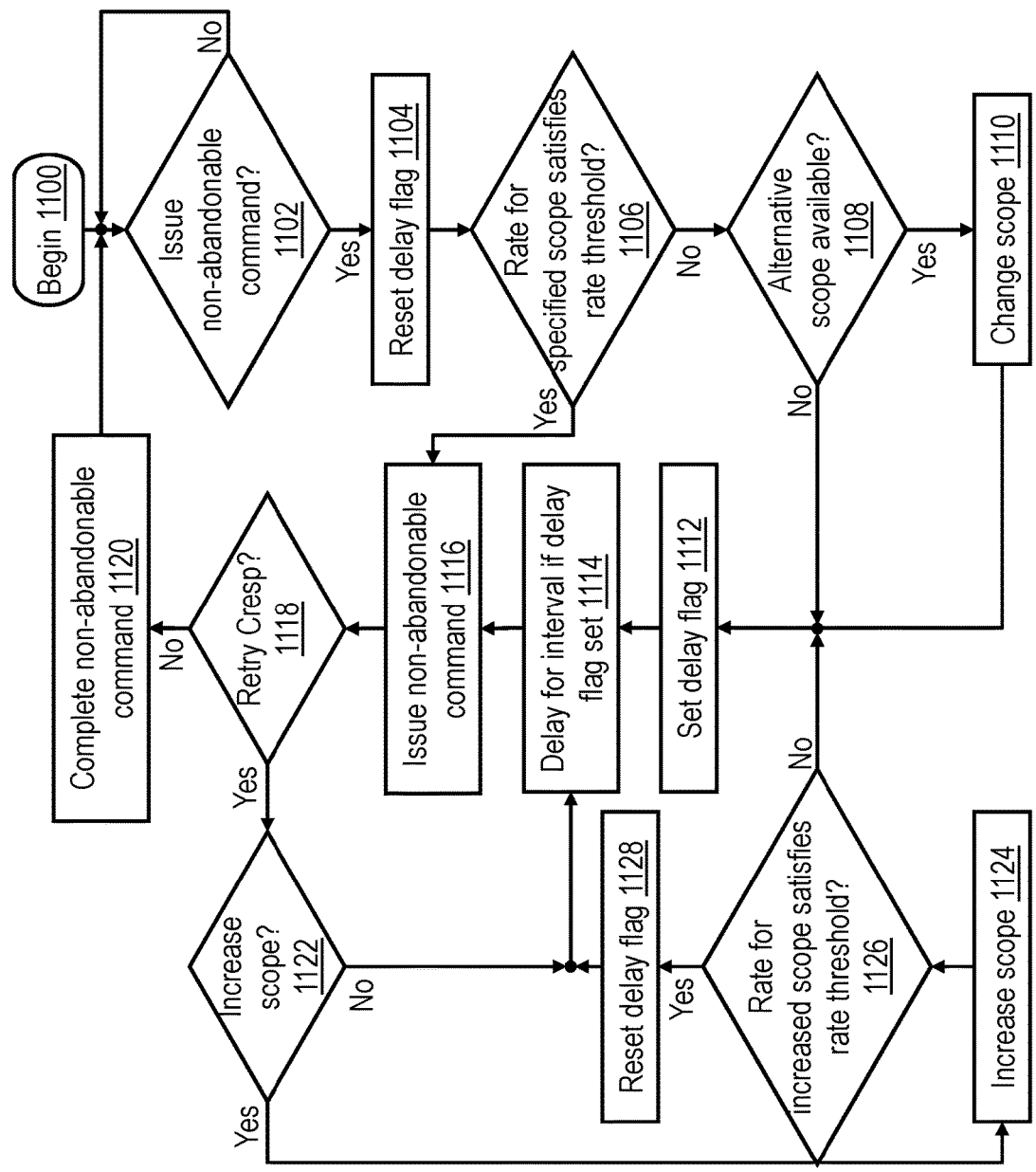
FIG. 11 is a high-level logical flowchart of an exemplary process by which a coherence participant issues a non-abandonable command on the system fabric of a data processing system in accordance with one embodiment.

With reference now to FIG. 11, there is illustrated a high-level logical flowchart of an exemplary process by which a master 400 issues a non-abandonable command on the system fabric of a data processing system in accordance with one embodiment. Although other non-abandonable commands can be issued by various masters 400 in data processing system 100, in the following discussion it will be assumed for ease of understanding that the non-abandonable command is a demand memory access command (e.g., a READ, RWITM, DCLAIM, DCBZ, or WRITE) and that the master 400 issuing the non-abandonable command is a RC machine 312. An instance of the illustrated process can be performed concurrently by each of the RC machines 312 in data processing system 100.

The process of FIG. 11 begins at block 1100 and then proceeds to block 1102, which illustrates a determination by the RC machine 312 whether or not a non-abandonable command, such as a demand memory access command, is to be issued on the system fabric. RC machine 312 may determine at block 1102 that a non-abandonable command is to be issued on the system fabric, for example, in response to dispatch, to the RC machine 312, of a memory access request of the affiliated processor core 200 that did not hit in L2 directory 308 in a coherence state that permits the memory access request to be serviced entirely by L2 cache 230. If RC machine 312 makes a negative determination at block 1102, the process simply iterates at block 1102. If, however, RC machine 312 makes an affirmative determination at block 1102, RC machine 312 resets an internal delay flag (block 1104) and accesses a broadcast scope for the demand memory access command generated by scope predictor 325 (e.g., node, group, or global scope). RC machine 312 additionally determines at block 1106 whether or not the rate specified for the relevant broadcast scope in one of rate registers 370-374 satisfies a demand rate threshold. For example, in some embodiments, a respective demand rate threshold is predetermined for each broadcast scope, and RC machine 312 determines at block 1106 whether the rate in the relevant one of rate registers 370-374 is below the predetermined demand rate threshold.

In response to an affirmative determination at block 1106, the process passes to block 1116, which is described below. If, however, RC machine 312 makes a negative determination at block 1106, RC machine 312 additionally determines at block 1108 whether or not an alternative scope of broadcast can be used, for example, because the rate specified for a different broadcast scope in one or more of rate registers 370-374 satisfies the demand rate threshold at which a demand memory access command may be issued for that alternative broadcast scope. At block 1108, if multiple demand rate thresholds are satisfied, the RC machine 312 can select either a larger scope of broadcast or smaller scope of broadcast than the scope of broadcast indicated by scope predictor 325. If multiple alternative scopes of broadcast can be selected, RC machine 312 preferably makes a selection among the possible alternative broadcast scopes based on one or more criteria, including which alternative broadcast scope has the least congestion. RC machine 312 also preferably biases its selection of an alternative broadcast scope toward the selection of a larger scope of broadcast, if possible. If RC machine 312 determines at block 1108 that no alternative scope of broadcast is available, the process of FIG. 11 passes to block 1112, which is described below. If, however, RC machine 312 makes an affirmative determination at block 1108, RC machine 312 changes the selected scope of broadcast of the demand memory access command to the preferred alternative scope (block 1110).

Referring now to block 1112, RC machine 312 sets its internal delay flag, and as shown in block 1114, waits a predetermined or pseudo-randomly selected delay interval based on the delay flag being set. The delay imposed by RC machine 312 at block 1114 reduces congestion on the system fabric for commands of the selected broadcast scope. It should be appreciated that a similar delay interval could be applied following block 1012 of FIG. 10. After the delay interval imposed at block 1114 elapses, RC machine 312 issues a non-abandonable command (e.g., a demand memory access command) on the system fabric utilizing either the broadcast scope originally selected by scope predictor 325 or the alternative scope selected at blocks 1108 and 1110 (block 1116). As noted above, issuance of the demand memory access command at block 1114 includes the substeps of issuing, on the system fabric, a request for permission to issue a command of the desired broadcast scope on the system fabric, awaiting an acknowledgement from the system fabric granting permission to issue the command, and then issuing the demand memory access command at the granted scope of broadcast. The PF machine 313 then monitors for receipt of the combined response 410 for the demand memory access command, as shown at block 1118. If the combined response for the demand memory access command is other than a Retry combined response, thus indicating success of the demand memory access command, the process passes to block 1120, which illustrates L2 cache 230 performing any additional actions required to complete the demand memory access command, such as receiving and caching requested data, transmitting store data, etc. Thereafter, RC machine 312 is released to return to an idle state, and the process of FIG. 11 returns to block 1102, which has been described.

Returning to block 1118, in response to RC machine 312 determining that that combined response of the demand memory access command is a Retry combined response, RC machine 312 additionally determines at block 1122 whether or not to increase a scope of broadcast of the demand memory access command when reissued. For example, RC machine 312 may determine to increase the broadcast scope of the demand memory access command if the Retry combined response indicates that the Retry was due to a failure to locate the coherence participant(s) (e.g., HPC and/or LPC) required to successfully complete the demand memory access command. Similarly, RC machine 312 may determine to increase the broadcast scope of the demand memory access command based on receipt of a Retry_overrun combined response indicating an inability of an instance of fabric control logic 212 to forward the demand memory access command due to congestion on the system fabric at the prior scope of broadcast. In response to a negative determination at block 1122, the process returns to block 1114 and following blocks, which have been described. Alternatively, if RC machine 312 determines at block 1122 to increase the broadcast scope (e.g., from the node scope to the group or global scope or from the group scope to the global scope), RC machine 312 increases the broadcast scope to the best available broadcast scope at block 1124.

At block 1126, RC machine 312 determines whether or not the rate specified for the increased broadcast scope in one of rate registers 370-374 satisfies a demand rate threshold. For example, in some embodiments, a respective demand rate threshold is predetermined for each broadcast scope, and RC machine 312 determines at block 1126 whether the rate in the relevant one of rate registers 370-374 is below the predetermined demand rate threshold. In response to a negative determination at block 1126, the process passes to block 1112, which has been described. If, however, RC machine 312 makes an affirmative determination at block 1126, RC machine 312 resets its internal delay flag (block 1128), and the process returns to block 1114 and following blocks, which have been described.

Figure 12:
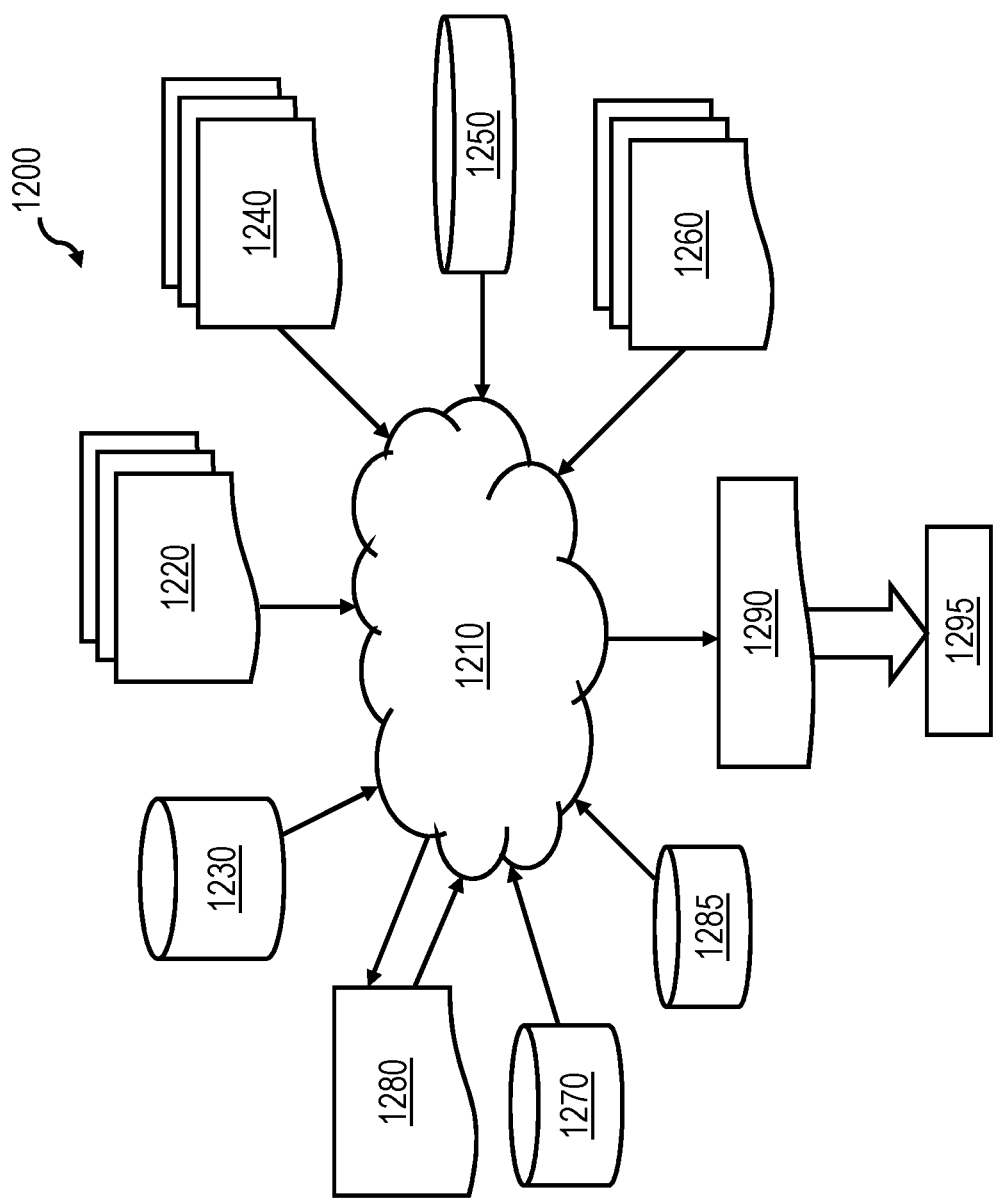
FIG. 12 illustrates an exemplary design process in accordance with one embodiment.

Referring now to FIG. 12, there is depicted a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of the design structures and/or devices described above and shown herein. The design structures processed and/or generated by design flow 1200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1020 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a machine-readable data transmission, gate array, or storage medium, design structure 1220 may be accessed and processed by one or more hardware and/or software modules within design process 1210 to simulate or otherwise functionally represent an electronic component, circuit, electronic or logic module, apparatus, device, or system such as those shown herein. As such, design structure 1220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of the components, circuits, devices, or logic structures shown herein to generate a netlist 1280 which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is resynthesized one or more times depending on design specifications and parameters for the device. As with other design structure types described herein, netlist 1280 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1210 may include hardware and software modules for processing a variety of input data structure types including netlist 1280. Such data structure types may reside, for example, within library elements 1230 and include a set of commonly used elements, circuits, and devices, including models, layouts, and symbolic representations, for a given manufacturing technology (e.g., different technology nodes, such as 5 nm, 7 nm, 9 nm, etc.). The data structure types may further include design specifications 1240, characterization data 1250, verification data 1260, design rules 12110, and test data files 1285 which may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as timing analysis, verification, design rule checking, place and route operations, etc.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290. Design structure 1290 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1290 may comprise a compiled, executable HDL simulation model that functionally simulates the devices shown herein.

Design structure 1290 may also employ a data format used for the exchange of layout data of integrated circuits and/or symbolic data format (e.g., information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1290 may then proceed to a stage 1295 where, for example, design structure 1290: proceeds to tape-out, is released to manufacturing, is released to a mask house, is sent to another design house, is sent back to the customer, etc.

As has been described, in at least one embodiment, a coherent data processing system includes a system fabric communicatively coupling a plurality of coherence participants and fabric control logic. The fabric control logic quantifies congestion on the system fabric based on coherence messages associated with commands issued on the system fabric. Based on the congestion on the system fabric, the fabric control logic determines a rate of request issuance applicable to a set of coherence participants among the plurality of coherence participants. The fabric control logic issues at least one rate command to set a rate of request issuance to the system fabric of the set of coherence participants.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a coherent data processing system including a system fabric communicatively coupling a plurality of coherence participants, said method comprising:
   fabric control logic quantifying congestion on the system fabric based on coherence messages associated with commands issued on the system fabric;
   based on the congestion on the system fabric, the fabric control logic determining a rate of request issuance applicable to a set of coherence participants among the plurality of coherence participants;
   the fabric control logic issuing at least one rate command to set a rate of request issuance to the system fabric of the set of coherence participants; and
   a master coherence participant among the plurality of coherence participants abandoning a command based on the rate of request issuance.

2. The method of claim 1, wherein:
   the set of coherence participants is one of multiple sets of coherence participants;
   each of the multiple sets of coherence participants corresponds to a respective one of multiple different broadcast scopes for commands on the system fabric; and
   the issuing includes the fabric control logic issuing the at least one rate command to set a respective rate of request issuance for each of the multiple broadcast scopes.

3. The method of claim 1, wherein:
the command is a data prefetch command; and
the abandoning includes abandoning the data prefetch command based on a confidence score supplied by a processor core in association with the data prefetch command.

4. The method of claim 1, further comprising:
a master coherence participant among the plurality of coherence participants delaying issuance of a command based on the rate of request issuance.

5. The method of claim 1, wherein:
the set of coherence participants is one of multiple sets of coherence participants;
each of the multiple sets of coherence participants corresponds to a respective different one of multiple broadcast scopes for commands on the system fabric; and
the method further comprises a master coherence participant among the plurality of coherence participants changing a broadcast scope of a command to a different one of the multiple broadcast scopes based on the rate of request issuance.

6. The method of claim 1, wherein quantifying congestion includes counting a number of Retry coherence response indicating an overrun of the bandwidth of the system fabric.

7. An integrated circuit for a coherent data processing system including a system fabric communicatively coupling a plurality of coherence participants, the integrated circuit comprising:
fabric control logic coupled to the system fabric of the data processing system and configured to perform:
quantifying congestion on the system fabric based on coherence messages associated with commands issued on the system fabric;
based on the congestion on the system fabric, determining a rate of request issuance applicable to a set of coherence participants among the plurality of coherence participants; and
issuing at least one rate command to set a rate of request issuance to the system fabric of the set of coherence participants; and
a master coherence participant among the plurality of coherence participants, wherein the master coherence participant is configured to perform:
abandoning a command based on the rate of request issuance.

8. The integrated circuit of claim 7, wherein:
the set of coherence participants is one of multiple sets of coherence participants;
each of the multiple sets of coherence participants corresponds to a respective one of multiple different broadcast scopes for commands on the system fabric; and
the issuing includes the fabric control logic issuing the at least one rate command to set a respective rate of request issuance for each of the multiple broadcast scopes.

9. The integrated circuit of claim 7, wherein:
the command is a data prefetch command; and
the abandoning includes abandoning the data prefetch command based on a confidence score supplied by a processor core in association with the data prefetch command.

10. The integrated circuit of claim 7, further comprising:
a master coherence participant among the plurality of coherence participants, wherein the master coherence participant is configured to perform:
delaying issuance of a command based on the rate of request issuance.

11. The integrated circuit of claim 7, wherein:
the set of coherence participants is one of multiple sets of coherence participants;
each of the multiple sets of coherence participants corresponds to a respective different one of multiple broadcast scopes for commands on the system fabric; and
the integrated circuit further comprises a master coherence participant among the plurality of coherence participants, wherein the master coherence participant is configured to perform:
changing a broadcast scope of a command to a different one of the multiple broadcast scopes based on the rate of request issuance.

12. The integrated circuit of claim 7, wherein:
the integrated circuit includes a counter; and
quantifying congestion includes counting, by the counter, a number of Retry coherence response indicating an overrun of the bandwidth of the system fabric.

13. A data processing system, comprising:
a plurality of integrated circuits in accordance with claim 7; and
the system fabric communicatively coupling the plurality of integrated circuits.

14. A design structure tangibly embodied in a machine-readable storage device for designing, manufacturing, or testing an integrated circuit, the design structure comprising:
an integrated circuit for a coherent data processing system including a system fabric communicatively coupling a plurality of coherence participants, the integrated circuit including:
fabric control logic coupled to the system fabric of the data processing system and configured to perform:
quantifying congestion on the system fabric based on coherence messages associated with commands issued on the system fabric;
based on the congestion on the system fabric, determining a rate of request issuance applicable to a set of coherence participants among the plurality of coherence participants; and
issuing at least one rate command to set a rate of request issuance to the system fabric of the set of coherence participants; and
a master coherence participant among the plurality of coherence participants, wherein the master coherence participant is configured to perform:
abandoning a command based on the rate of request issuance.

15. The design structure of claim 14, wherein:
the set of coherence participants is one of multiple sets of coherence participants;
each of the multiple sets of coherence participants corresponds to a respective one of multiple different broadcast scopes for commands on the system fabric; and
the issuing includes the fabric control logic issuing the at least one rate command to set a respective rate of request issuance for each of the multiple broadcast scopes.

16. The design structure of claim 14, wherein:
the command is a data prefetch command; and
the abandoning includes abandoning the data prefetch command based on a confidence score supplied by a processor core in association with the data prefetch command.

17. The design structure of claim 14, further comprising:
a master coherence participant among the plurality of coherence participants, wherein the master coherence participant is configured to perform:

delaying issuance of a command based on the rate of request issuance.

\* \* \* \* \*